T. B. JEFFERY, DEC'D.
K. E., O. T. & H. W. JEFFERY, EXECUTORS.
TILTING BODY FOR AUTOMOBILES.
APPLICATION FILED APR. 28, 1906.
976,572.
Patented Nov. 22, 1910.
2 SHEETS—SHEET 2.
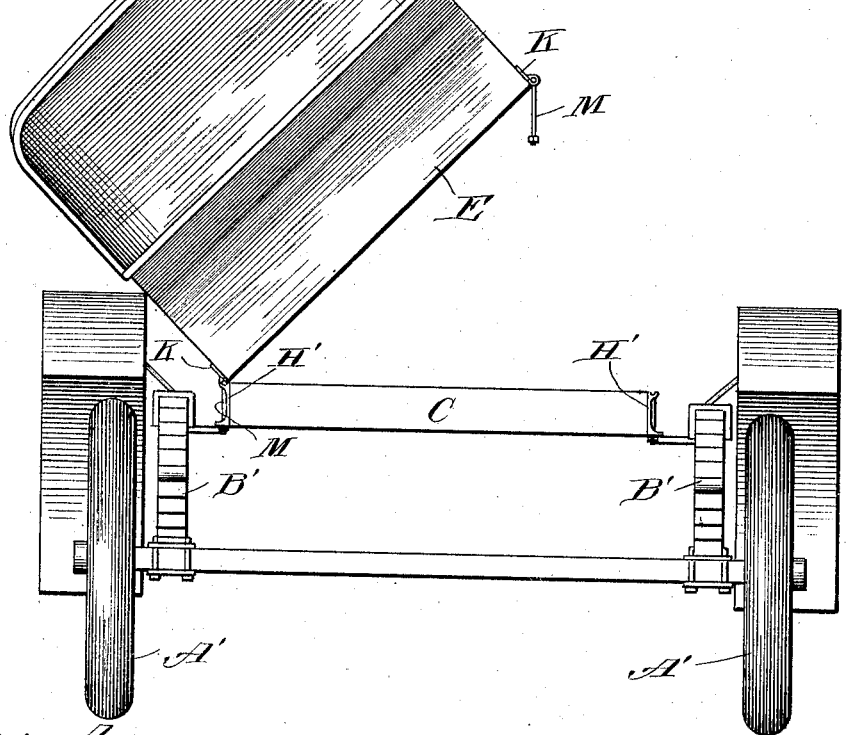
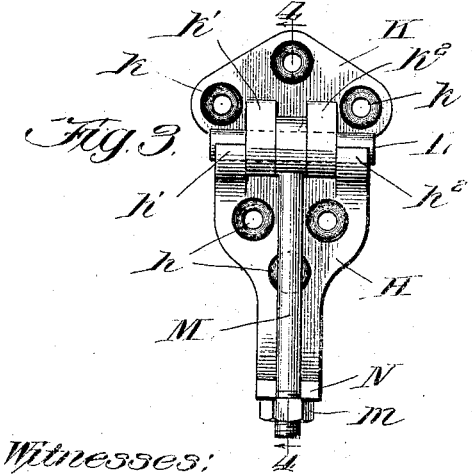
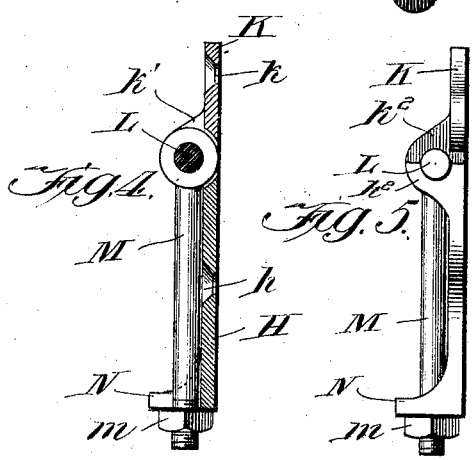
Witnesses:
Inventor:
Thomas B. Jeffery
his Attorneys

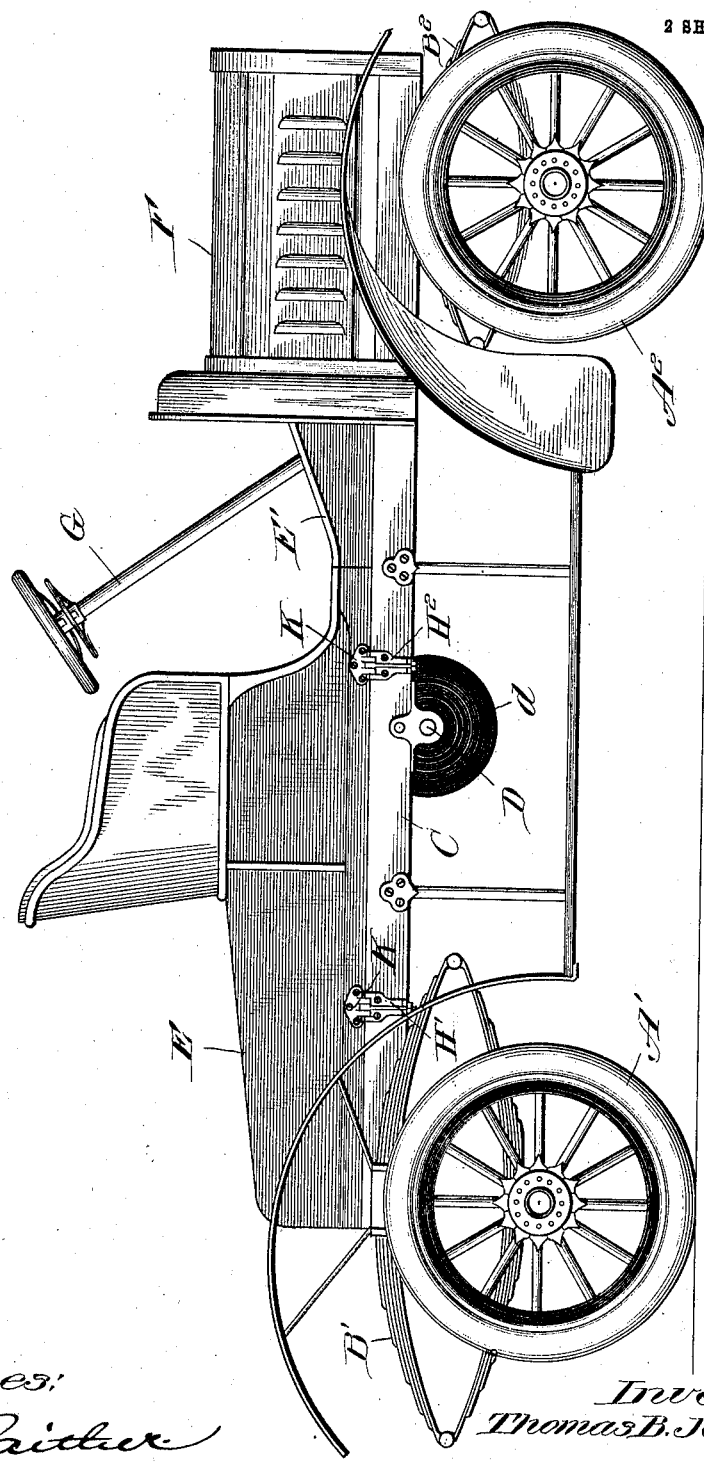

UNITED STATES PATENT OFFICE.

THOMAS B. JEFFERY, OF KENOSHA, WISCONSIN; KATE E. JEFFERY, CHARLES T. JEFFERY, AND HAROLD W. JEFFERY, EXECUTORS OF SAID THOMAS B. JEFFERY, DECEASED.

TILTING BODY FOR AUTOMOBILES.

976,572.          Specification of Letters Patent.      Patented Nov. 22, 1910.

Application filed April 28, 1906. Serial No. 314,112.

*To all whom it may concern:*

Be it known that I, THOMAS B. JEFFERY, a citizen of the United States, residing at Kenosha, county of Kenosha, State of Wisconsin, have invented a certain new and useful Improvement in Tilting Bodies for Automobiles, and declare the following to be a full, clear, and exact description of the same, such as will enable others skilled in the art to which it pertains to make and use the same, reference being had to the accompanying drawings, which form a part of this specification.

My invention relates in general to automobiles, and more particularly to means for rendering the mechanism beneath the body readily accessible.

In most automobiles more or less of the machinery is located beneath the body. When the engine is single or double cylinder it, as well as the transmission and other mechanism, is placed beneath the body and even those machines in which the engines are located in front, portions of the machinery are beneath the body.

It is frequently necessary to remove the bodies of automobiles in order that the engines or other mechanism may be examined or repaired. This operation requires time and labor as the bodies have to be disconnected from their supporting frames and then lifted therefrom.

The primary object of my invention is to provide an automobile the body of which may be easily swung upwardly from either side of the supporting frame thereby permitting the machinery beneath the body to be conveniently examined and repaired.

A further object of my invention is to provide a combined hinge and clamp for securing an automobile body to its supporting frame by means of which the body may be swung upwardly from either side of the automobile.

My invention will be more fully described hereinafter with reference to the accompanying drawings in which the same is illustrated as embodied in a convenient and practical form, and in which,—

Figure 1 is a side elevational view of an automobile embodying my invention; Fig. 2 a rear elevational view showing the body swung upwardly; Fig. 3 an enlarged elevational view of the combined hinge and clamp; Fig. 4 a sectional view on line 4—4 Fig. 3, and Fig. 5 a side elevational view looking from the right in Fig. 4.

The same reference characters are used to designate the same parts in the several figures of the drawings.

Reference characters $A'$ $A^2$ designate the rear and front wheels of an automobile upon the axles of which are supported rear and front springs $B'$ and $B^2$.

C indicates the supporting frame for the body which is mounted upon the front and rear springs $B'$ and $B^2$.

The engine and other mechanism for driving the automobile are supported by the frame C.

D indicates the crank shaft the ends of which are journaled in brackets carried by the side rails of the frame C and upon which is mounted the fly wheel $d$. Inasmuch as the engine and other mechanism form no part of my invention, it is not necessary that they should be further illustrated or described in order that my improvement may be fully understood.

F designates the bonnet at the front of the automobile which may serve either as a storage box or to inclose the engine.

$E'$ indicates the foot rest which is fixed to the frame C and through which the steering shaft G extends.

E designates the body of the automobile beneath which is located the engine or other machinery which at times it is necessary to either examine or repair. The body E is supported upon the frame C and in order that it may be swung upwardly from either side of the frame I provide a combined hinge and clamp constructed as shown in detail in Figs. 3 to 5.

H designates a plate adapted to be rigidly secured to the outer surface of the frame C by any suitable means, such for instance as by screws passing through holes $h$. The plate H is provided with lugs $h'$ $h^2$ at its upper edge which are provided with semi-cylindrical seats in their upper surfaces. The lower end of the plate H is provided with an outwardly projecting lug N having an open slot therein.

K designates a bracket adapted to be rigidly secured to the body of the automobile immediately above the plate H. Any suitable means may be provided for securing the bracket to the body as for instance passing through screw holes $k$. Ears $k'$ $k^2$ are formed on the bracket K and are spaced apart to receive between them a ring formed at the upper end of a rod M. A pin L extends through registering holes in the ears $k'$ $k^2$ and interposed head on the rod M. The ends of the pin L project beyond the ears $k'$ $k^2$ and are adapted to be received within the curved seats in the lugs $h'$ $h^2$ of the plate H. The rod M is adapted to swing within the slot in the lug N and to be retained therein by a nut $m$ engaging screw threads on its lower end which depends below the lug N.

The body E and frame C are provided on each side with a plurality of devices such as above described. In Fig. 1 I have shown two of such fastening devices H' and H² located intermediate of the front and rear wheels so as to be readily accessible.

The manner of using and operation of my improvement are as follows: Two or more plates H are secured to each side of the frame C. A similar number of brackets K are secured to each side of the body E in vertical alinement with the plates H. The body is then placed upon the frame C with the brackets K alining with the respective plates H and with the pins L supported within the semi-cylindrical seats in the lugs $h'$ $h^2$ of the several plates. The depending rods N are then swung within the slots in the lugs N on the lower ends of the plates H. The nuts $m$ are then adjusted upon the rods so as to tightly engage the under surfaces of the lugs N thereby clamping the brackets to the plates. When it is desired to swing the body upwardly from either side of the frame the nuts $m$ on the rods M on such side of the frame are loosened sufficiently to permit the rods being swung out of engagement with the lugs N. The body may then be swung upwardly as the brackets separate from the supporting plates. The united brackets and plates on the opposite side of the automobile serve as hinges about which the body swings, the pins L serving as fulcrums to support the body upon the lugs $h'$ $h^2$ of the plates. After the necessary inspection or repair of the engine or other mechanism has been made, the body is permitted to swing downwardly so that the pins L will again rest upon the lugs $h'$ $h^2$ after which the rods M are clamped to the plates H through the engagement of the nuts $m$ with the lugs N.

It is evident that the body may be swung upwardly from either side according to the position of the automobile or according to the location of the engine or machinery which is to be inspected or repaired. It is also evident that the combined hinges and clamps may be reached by the operator without the necessity of going under the car.

From the foregoing description it will be observed that I have invented an improved automobile body and supporting frame therefor by means of which the body will be securely fastened to the frame and at the same time permit the body to be swung upwardly above the frame from either side thereof thereby rendering the engine and other mechanism normally hidden by the body readily accessible.

Having now fully described my invention, what I claim as new and desire to secure by Letters Patent is:

1. In an automobile, the combination with a body, of a supporting frame for said body, means connecting said body to said frame for permitting the body to be swung upwardly, said means comprising a plate fixed to said frame, a bracket fixed to said body, a pin whereby said bracket is adapted to rest upon said plate, and a rod depending from said bracket adapted to detachably engage the lug on said plate.

2. In an automobile, a combined hinge and clamp for detachably connecting the body to the supporting frame, comprising a plate fixed to the frame, lugs formed on said plate having seats therein, a bracket fixed to said body, a pin carried transversely by said bracket and adapted to rest upon the seats in said lugs, a depending rod pivotally supported by said pin, a lug on said plate having a slot into which said rod is adapted to swing, and a nut on said rod for engaging the underside of said lug.

3. In an automobile, a body, a supporting frame, hinges arranged on opposite sides of the body and frame, each of said hinges comprising a member fixed to the body and a member fixed to the frame, one of said members having trunnions and the other member having open bearings for said trunnions, and a detachable clamping device for holding said trunnions in said bearing.

4. In an automobile, a body member, a supporting member, hinges carried by one of said members, and clamping devices coöperating with one half of each of the hinges for clamping the hinges to the other of said members so as to permit the hinges to be unclamped without producing relative movements of said members.

In testimony whereof, I sign this specification in the presence of two witnesses.

THOMAS B. JEFFERY.

Witnesses:
 GEO. H. EDDY,
 JOS. M. GAFFNEY.